(12) United States Patent
Bouzekri

(10) Patent No.: US 6,398,887 B1
(45) Date of Patent: Jun. 4, 2002

(54) ALUMINUM-KILLED LOW CARBON STEEL SHEET FOR CONTAINERS AND METHOD OF MAKING

(75) Inventor: Mohamed Bouzekri, Rombas (FR)

(73) Assignee: Sollac, Puteuax (FR)

( * ) Notice: Subject to any disclaimer, the term of this patent is extended or adjusted under 35 U.S.C. 154(b) by 0 days.

(21) Appl. No.: 09/609,429

(22) Filed: Jun. 30, 2000

(30) Foreign Application Priority Data

Jul. 1, 1999 (FR) .............................. 99 08414

(51) Int. Cl.⁷ ................................. C22C 8/02
(52) U.S. Cl. ................. 148/652; 148/651; 148/661; 148/320; 148/328
(58) Field of Search .............. 148/651, 652, 148/661, 603, 320, 328

(56) References Cited

U.S. PATENT DOCUMENTS 3,947,293 A * 3/1976 Takechi et al. ............. 148/603
4,551,182 A * 11/1985 Akisue et al. ............... 148/603
4,561,909 A * 12/1985 Sunami et al. .............. 148/603
6,171,413 B1 * 1/2001 Funakawa et al. ........... 148/603

FOREIGN PATENT DOCUMENTS

| DE | 196 22 164 | 5/1997 |
| EP | 0 360 955 A2 | 4/1990 |
| EP | 0 360 955 A3 | 4/1990 |
| FR | 2 472 021 | 6/1981 |
| GB | 2 086 425 | 5/1982 |

OTHER PUBLICATIONS

Patent Abstracts of Japan; vol. 006, No. 044, Mar. 19, 1982; & JP 56 158822, Dec. 7, 1981.

* cited by examiner

*Primary Examiner*—Deborah Yee
(74) *Attorney, Agent, or Firm*—Oblon, Spivak, McClelland, Maier & Neustadt, P.C.

(57) ABSTRACT

The object of the invention is an aluminum-killed low-carbon steel sheet comprising by weight between 0.022 and 0.035% of carbon, between 0.15 and 0.25% of manganese, between 0.040 and 0.070% of aluminum, between 0.004 and 0.006% of nitrogen, the remainder being iron and the inevitable trace impurities.

The steel contains carbon in free state, a grain count per mm² greater than 20000 and, in the aged condition, has a percentage elongation A% satisfying the relationship:

$$(670-Rm)/14 \leq A\% \leq (720-Rm)/17$$

where Rm is the maximum rupture strength.

9 Claims, 3 Drawing Sheets

ALUMINUM-KILLED LOW CARBON STEEL SHEET FOR CONTAINERS AND METHOD OF MAKING

The present invention relates to the area of steels for application in the field of metal containers for food, non-food products or industrial purposes.

The steels smelted for uses specific to metal containers differ from thin sheets in particular by their physical characteristics.

The thicknesses of steel sheets for containers vary from 0.12 mm to 0.25 mm for the great majority of uses, but can reach greater thicknesses, as much as 0.49 mm, for very special applications. This is the case, for example, of certain containers for non-food products, such as certain aerosols, or the case of certain industrial containers. Their thickness can also be as small as 0.08 mm, in the case of food receptacles, for example.

Steel sheets for containers are usually coated with a metal coat (tin, which may or may not be remelted, or chrome), on which there is generally deposited an organic coat (varnish, inks, plastic films).

In the case of two-piece containers, these are made by deep-drawing under a blank holder or by deep-drawing/trimming for beverage cans, and are generally cylindrical or frustoconical, axially symmetric cans. The container designers are showing increasing interest in even thinner steels, however, with thickness from 0.12 mm to 0.075 mm and, with the objective of distinguishing themselves from the competitors, they are trying to introduce increasingly more complex shapes. Thus we now find cans of original shapes, manufactured from steel sheets of small thicknesses, which sheets, even though presenting greater forming difficulties, must meet the use criteria (mechanical durability of the containers, resistance to the axial load to which they are subjected during storage in stacks, resistance to the internal overpressure to which they are subjected during sterilizing heat treatment and to the internal partial vacuum to which they are subjected after cooling) and therefore must have very high mechanical strength.

Thus the use and performance of these containers depend on a certain number of mechanical characteristics of the steel:

coefficient of planar anisotropy, $\Delta C$ aniso,

Lankford coefficient, yield strength Re, maximum rupture strength Rm, elongation A%, distributed elongation Ag%.

To impart to the container equivalent mechanical strength at smaller steel thickness, it is indispensable that the steel sheet present a higher maximum rupture strength.

It is known that containers can be made by using standard aluminum-killed low-carbon and low-manganese steels.

The carbon content customarily sought for this type of steel ranges between 0.020% and 0.040%, because contents in excess of 0.040% lead to mechanical characteristics less favorable for deep-drawing, and contents below 0.015% bring about a tendency to natural aging of the sheet, despite an aging in annealing.

The manganese is reduced as much as possible because of an unfavorable effect of this element on the value of the Lankford coefficient for steels not degassed under vacuum. Thus the manganese content sought ranges between 0.15 and 0.25%.

These steel sheets are made by cold rolling a hot strip to a cold-rolling ratio of between 75% and more than 90%, followed by continuous annealing at a temperature of between 640 and 700° C., and a second cold-rolling with a percentage elongation which varies between 2% and 45% during this second cold-rolling depending on the desired level of maximum rupture strength Rm.

For aluminum-killed low-carbon steels, however, high mechanical characteristics are associated with poor elongation capacity. This poor ductility, apart from the fact that it is unfavorable to forming of the container, leads during such forming to thinning of the walls, a phenomenon which will be unfavorable to the performances of the container.

Thus for example, an aluminum-killed low-carbon steel with a maximum rupture strength Rm on the order of 550 MPa will have a percentage elongation A% on the order of only 1 to 3%.

The objective of the present invention is to provide an aluminum-killed low-carbon steel sheet for containers which has, at a level of maximum rupture strength equivalent to that of aluminum-killed low-carbon steels of the prior art, a higher percentage elongation A%.

To achieve these characteristics, the invention has as its object a process for manufacturing an aluminum-killed low-carbon steel strip for containers in which:

a hot-rolled steel strip is supplied which contains by weight between 0.022 and 0.035% of carbon, between 0.15 and 0.25% of manganese, between 0.040 and 0.070% of aluminum, between 0.0035 and 0.0060% of nitrogen, the remainder being iron and the inevitable trace impurities, the strip is passed through a first cold-rolling, the cold-rolled strip is subjected to annealing, a secondary cold-rolling is performed if necessary, characterized in that the annealing is a continuous annealing in which the cycle comprises a temperature rise up to a temperature higher than the temperature of onset of pearlitic transformation $Ac_1$, holding the strip above this temperature for a duration of longer than 10 seconds, and rapidly cooling the strip to a temperature of below 350° C. at a cooling rate in excess of 100° C. per second.

According to other characteristics of the process according to the invention:

the strip is maintained during annealing at a temperature of between $Ac_1$ and 800° C. for a duration ranging from 10 seconds to 2 minutes;

the cooling rate is between 100° C. and 500° C. per second;

the strip is cooled at a rate in excess of 100° C. per second to room temperature.

The invention also relates to an aluminum-killed low-carbon steel sheet for containers, comprising by weight between 0.022 and 0.035% of carbon, between 0.15 and 0.25% of manganese, between 0.040% and 0.070% of aluminum, between 0.0035 and 0.0060% of nitrogen, the remainder being iron and the inevitable trace impurities, which steel is manufactured according to the foregoing process, characterized in that it has in the aged condition a percentage elongation A% satisfying the relationship:

$$(670-Rm)/14 \leq A\% \leq (720-Rm)/17$$

where Rm is the maximum rupture strength of the steel, expressed in MPa.

According to other characteristics of the sheet, the steel contains carbon in free state and/or some carbides precipitated at low temperature, and it has a grain count per mm² greater than 20000.

The characteristics and advantages will be made more clearly apparent in the description hereinafter, given exclusively by way of example, with reference to the attached figures.

Figure 1:
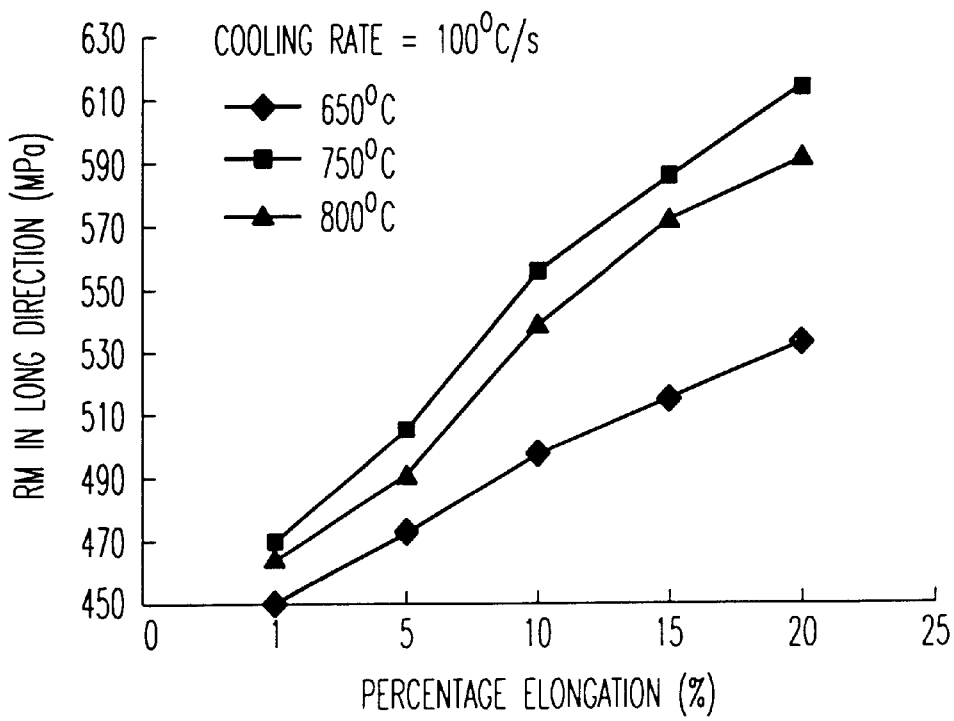
FIGS. 1 and 2 are diagrams showing the influence of annealing temperature on maximum rupture strength Rm.

Several tests were performed, first in the laboratory and then under industrial conditions, in order to validate the characteristics of the invention. The complete results of two of those tests will now be described.

These tests relate to two low-carbon steel cold coils, whose characteristics are presented in Table 1 hereinafter.

TABLE 1

|   | Contents ($10^{-3}$ %) | | | | Hot rolling | | | Cold rolling | |
|---|---|---|---|---|---|---|---|---|---|
|   | C | Mn | Al | N | Rolling end temp. (° C.) | Upcoiling temp. (° C.) | Thickness (mm) | Red. ratio (%) | Thickness (mm) |
| A | 23 | 186 | 50 | 3.6 | 860/880 | 530/565 | 1.97 | 89.8 | 0.20 |
| B | 25 | 203 | 58 | 4.8 | 860/880 | 530/565 | 2.00 | 87 | 0.28 |

The coil symbol is shown in the first column; the second through fifth columns indicate the contents in $10^{-3}$ wt % of the main constituents of importance. The sixth through eighth columns relate to the hot-rolling conditions: in the sixth column there is indicated the temperature at the end of hot rolling; in the seventh column the coiling temperature; in the eighth column the thickness of the hot strip. Finally, columns nine and ten relate to the cold-rolling conditions: in the ninth column there was indicated the percentage reduction achieved by cold rolling and in the tenth column the final thickness of the cold strip.

These two standard strips were subjected to different annealings followed by second cold-rollings, which were also different.

The holding temperatures in annealing varied from 650° C. to 800° C., the cooling rates varied from 40° C./s to 400° C./s and the percentage elongations in the second rolling varied from 1% to 42%.

In addition to the micrographic examinations, the characterization of the metal obtained from these different tests comprised on the one hand performing tension tests on 12.5×50 ISO specimens in the rolling direction and in the cross direction, in both the fresh condition and in the aged condition after aging at 200° C. for 20 minutes, and on the other hand determining the hardness HR30T, also in both the fresh condition and in the aged condition.

On the basis of these tests it was demonstrated that it is possible considerably to increase the maximum rupture strength Rm for the same aluminum-killed low-carbon steel with identical percentage elongation in the second cold-rolling, if a continuous annealing according to the conditions of the invention is performed between the two cold-rollings.

In other words, it was demonstrated on the basis of these tests that it is possible considerably to increase the ductility A% for the same aluminum-killed low-carbon steel with identical maximum rupture strength Rm if a continuous annealing according to the conditions of the invention is performed between the two cold-rollings, because the same level of Rm is achieved with a smaller percentage elongation during the second rolling. Thus it becomes possible to obtain grades of aluminum-killed low-carbon steel with an Rm level on the order of 380 MPa without necessitating a second rolling step after annealing, other than, perhaps, a light work-hardening operation known as skin pass, in order to suppress the yield-strength plateau present on the metal upon discharge from annealing.

Influence of the Composition of the Steel

As indicated hereinabove, the invention does not relate to the composition of the steel, which is a standard aluminum-killed low-carbon steel.

As for all aluminum-killed low-carbon steels, it is essentially the carbon and manganese contents which are important;

the carbon content customarily sought for this type of steel ranges between 0.022% and 0.040%, because contents in excess of 0.040% lead to mechanical characteristics less favorable for deep-drawing. For contents below 0.022%, there is no pearlitic transformation in cooling, and this pearlitic transformation is necessary and sought.

the manganese content is reduced as much as possible because of an unfavorable effect of this element on the value of the Lankford coefficient for steels not degassed under vacuum. Thus the manganese content sought ranges between 0.15 and 0.25%.

Nitrogen and aluminum also are two elements which it is expedient to control.

Extra nitrogen is used if it is wished to obtain a hard, aging steel. It generally ranges between 0.0035 and 0.0060%.

Aluminum is used to kill the steel. It generally ranges between 0.040 and 0.070%.

Influence of the Hot-denaturing Conditions

The continuously annealed aluminum-killed low-carbon steels are rolled at a temperature above $Ar_3$.

The essential parameter is the coiling temperature, cold coiling between 500 and 620° C. being preferred. In fact, hot coiling, at a temperature above 650° C., presents two drawbacks:

it generates heterogeneities in mechanical characteristics related to the differences between the cooling rates of the core and the extremities of the strip;

it leads to a risk of abnormal grain growth, which can occur for certain combinations (temperature at end of rolling, coiling temperature) and can constitute a latent defect both in hot sheet and in cold sheet.

Nevertheless, hot coiling may be achieved by using, for example, a selective coiling method, in which the temperature is higher at the extremities of the strip.

Influence of the Cold-rolling Conditions

By virtue of the small final thicknesses to be achieved, the range of cold reduction ratio extends from 75% to more than 90%.

The main factors involved in the definition of the cold reduction ratio quite obviously are the final thickness of the product, which can be influenced by choice of the thickness of the hot product, and also metallurgical considerations.

The metallurgical considerations are based on the influence of the cold reduction ratio on the microstructural condition and, consequently, on the mechanical characteristics after recrystallization and annealing. Thus an increase in cold reduction ratio leads to a lower recrystallization temperature, to smaller grains and to higher values of Re and Rm. In particular, the reduction ratio has a very strong influence on the Lankford coefficient.

In the case of requirements applicable to deep-drawing spurs, it is appropriate, for example, to optimize the steel grade, especially the carbon content, and the reduction ratio of cold rolling with the hardness or the desired mechanical characteristics in order to obtain a metal known as "spur-free metal".

Influence of Annealing

An important characteristic of the invention resides in the annealing temperature. It is important that the annealing temperature be higher than the point of onset of pearlitic transformation $Ac_1$ (on the order of 720° C. for this type of steel).

Another important characteristic of the invention resides in the cooling rate, which must be greater than 100° C./s.

While the strip is being held at a temperature above 720° C. there is formed carbon-rich austenite. The rapid cooling of this austenite allows a certain quantity of carbon to be maintained in free state and/or fine and disperse carbides to be precipitated at low temperature. This carbon in free state and/or these carbides formed at low temperature favor blocking of dislocations, thus making it possible to achieve high levels of mechanical characteristics without necessitating a large reduction during the ensuing second cold-rolling step.

It is therefore important to perform rapid cooling, between 100 and 500° C./s, at least to a temperature below 350° C. If the rapid cooling is stopped before 350° C., the atoms of free carbon will be able to combine and the desired effect will not be achieved. It is quite obvious that rapid cooling to room temperature is possible.

It is also possible to perform cooling at a rate faster than 500° C./s, but the Applicant has observed that the influence of an increase in cooling rate beyond 500° C./s is not very significant.

Figure 2:
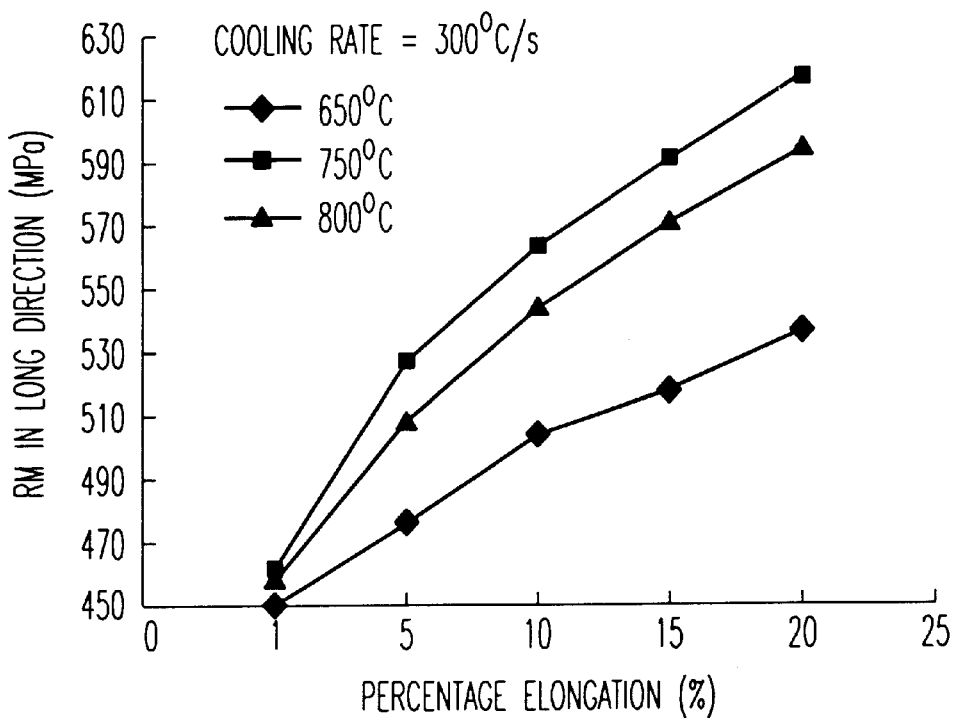

FIGS. 1 and 2 show the influence of annealing temperature at constant cooling rate (target rate 100° C./s; actual rate 73 to 102° C./s on FIG. 1; target rate 300° C./s; actual rate 228 to 331° C./s on FIG. 2) on the maximum rupture strength Rm.

It is evident from these figures that, for identical percentage elongation in the second rolling, Rm is clearly greater for the steels annealed at 740° C. and at 780° C. compared with the same steel annealed at 650° C. and at 680° C.

Nevertheless, this influence of annealing temperature on maximum rupture strength Rm is not very perceptible when the percentage elongation in the second cold-rolling is less than 3%. It becomes truly significant only starting from 5% elongation in the second cold-rolling.

If the temperature is too high (above 800° C.), there occurs at least partial precipitation of the nitrogen in the form of aluminum nitrides. This precipitated nitrogen no longer contributes to hardening of the steel, and the resulting effect is lowering of the maximum rupture strength Rm. There are signs of this phenomenon in FIG. 2, where it is noted that, for percentage elongations greater than 10%, the increase in maximum rupture strength Rm between the sample annealed at 750° C. and the sample annealed at 800° C. becomes smaller.

The time for which the strip is held between 720° C. and 800° C. must be sufficient to return all the carbon corresponding to equilibrium to solution. A holding time of 10 seconds is sufficient to ensure this return to solution of the quantity of carbon corresponding to equilibrium for the steels whose carbon content ranges between 0.020 and 0.035%, and a holding time of longer than 2 minutes, although possible, is impractical and costly.

Figure 3:
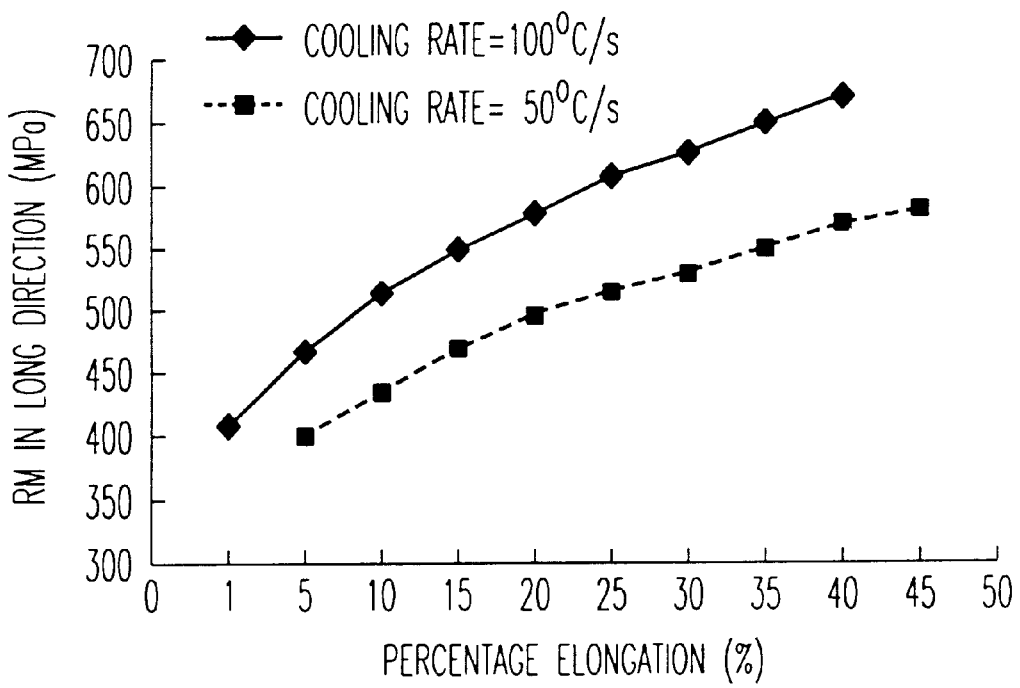
FIG. 3 is a diagram showing the influence of cooling rate on maximum rupture strength Rm.
Figure 4:
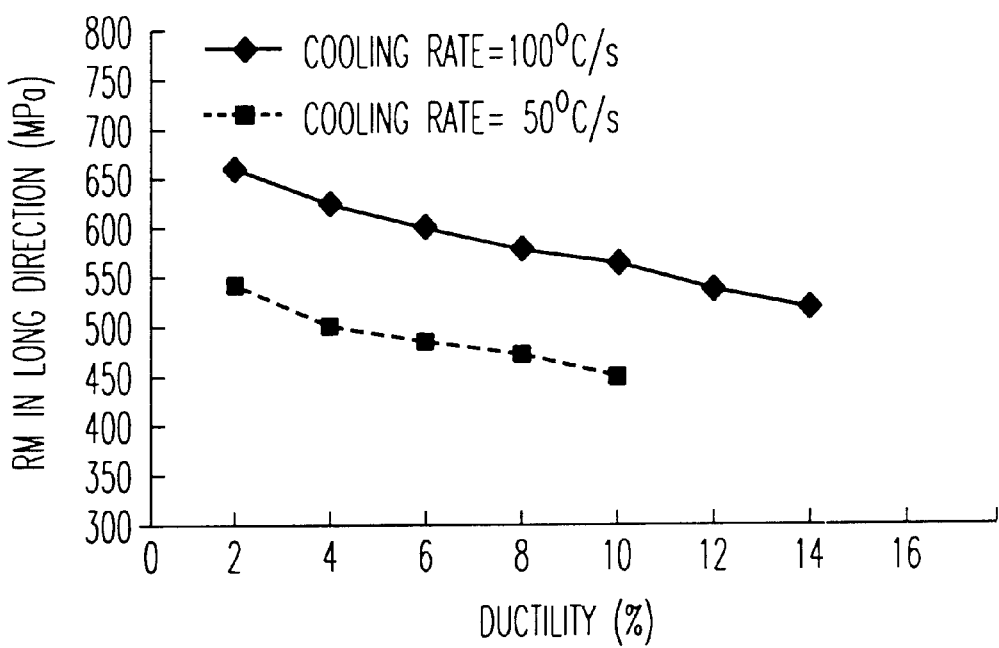
FIG. 4 is a diagram showing the influence of cooling rate on maximum rupture strength Rm and on the percentage elongation A%.

FIGS. 3 and 4 show the influence of cooling rate at constant annealing temperature (750° C.) maintained for 20 seconds.

As can be seen in FIG. 3, at 10% elongation in the second cold-rolling, the maximum rupture strength Rm of the steel is equal to about 520 MPa if the cooling rate is equal to 100° C./s, whereas it reaches only 440 MPa if the cooling rate is equal to 50° C./s.

It is therefore possible to obtain an aluminum-killed low-carbon steel whose value of Rm is equal to 520 MPa with only 10% elongation in the second cold-rolling if the cooling rate is equal to 100° C./s, whereas a second cold-rolling must be carried out with a percentage elongation of 25% if the cooling rate is only 50° C./s.

By virtue of this smaller percentage elongation in the second cold-rolling step, it is possible to minimize the loss of ductility of the steel. In FIG. 4, for example, it is evident that the steel whose Rm is equal to 520 MPa has a ductility A% equal to 14 when the cooling rate is equal to 100° C./s, whereas it is equal to 3.5 when the cooling rate is equal to 50° C./s.

Figure 5:
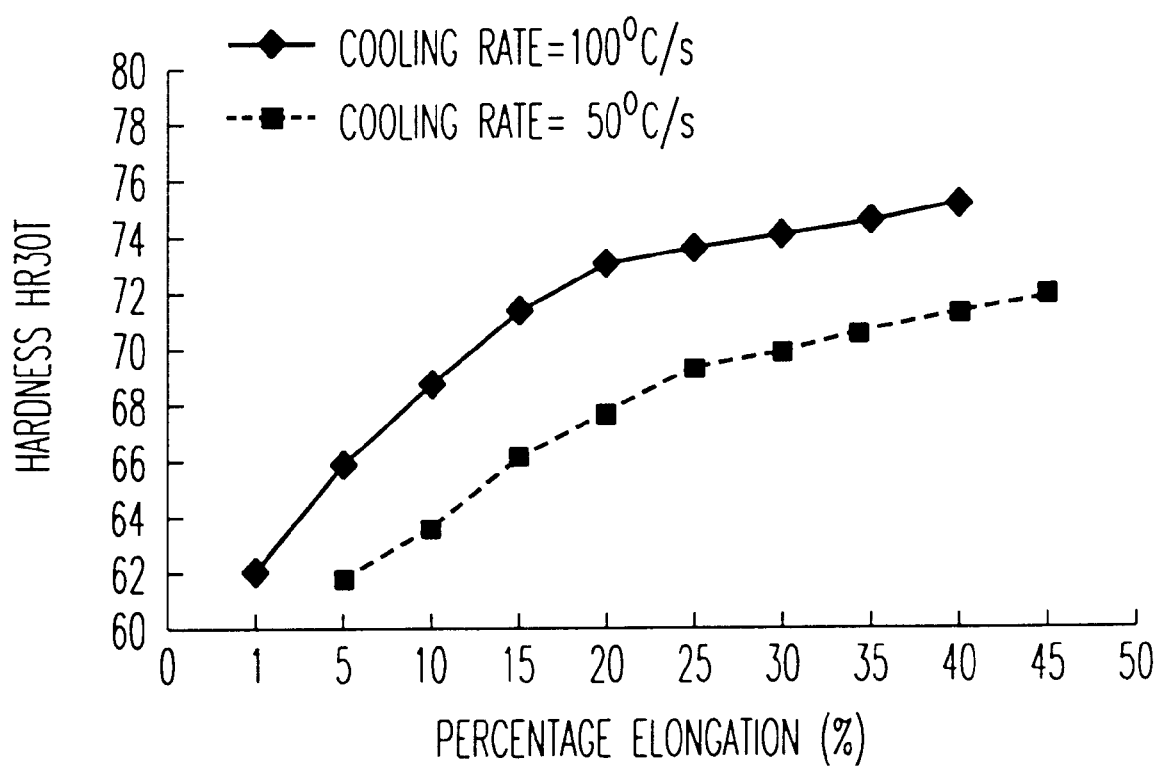
FIG. 5 is a diagram showing the influence of cooling rate on hardness HR30T.

This observation is also valid for the hardness of the steel. As is evident from FIG. 5, for the same percentage elongation in the second cold-rolling, the hardness of the steel increases if the cooling rate is equal to 100° C./s. This increase of the hardness is due to a higher content of free carbon and/or to the presence of fine and disperse precipitates.

The micrographic analyses of the samples revealed that the grain count per $mm^2$ is larger (greater than 20000), and that the carbides, when they are formed, comprise intergranular cementite.

Thus this manufacturing process makes it possible to obtain an aluminum-killed low-carbon steel for containers, comprising by weight between 0.022 and 0.035% of carbon, between 0.15 and 0.25% of manganese, between 0.040 and 0.070% of aluminum, between 0.0035 and 0.0060% of nitrogen, the remainder being iron and the inevitable trace impurities, which steel has in the aged condition a percentage elongation A% satisfying the relationship:

$$(670-Rm)/14 \leq A\% \leq (720-Rm)/17$$

What is claimed is:
1. A process for manufacturing an aluminum-killed low-carbon steel strip for containers in which:
   a hot-rolled steel strip is supplied which contains by weight between 0.022 and 0.035% of carbon, between 0.15 and 0.25% of manganese, between 0.040 and 0.070% of aluminum, between 0.0035 and 0.0060% of nitrogen, the remainder being iron and the inevitable trace impurities,
   the strip is passed through a first-cold-rolling, the cold-rolled strip is subjected to annealing, and a secondary cold-rolling is performed if necessary, characterized in that the annealing is a continuous annealing in which the cycle comprises a temperature rise up to a temperature higher than the temperature corresponding to the eutectoid of the steel, holding the strip above this temperature for a duration of 10 seconds or longer, and rapidly cooling the strip to a temperature of below 350° C. at a cooling rate in excess of 100° C. per second; and the annealing does not include overaging.

2. A process according to claim 1, characterized in that the strip is maintained during annealing at a temperature of between 720° C. and 800° C. for a duration ranging from 10 seconds to 2 minutes.

3. A process according to claim 1, characterized in that the cooling rate is between 100° C. and 500° C. per second.

4. A process according to claim 1, characterized in that the strip is cooled at a rate in excess of 100° C. per second to room temperature.

5. An aluminum-killed low-carbon steel sheet for containers, comprising by weight between 0.022 and 0.035% of carbon, between 0.15 and 0.25% of manganese, between 0.040 and 0.070% of aluminum, between 0.0035 and 0.0060% of nitrogen, the remainder being iron and the inevitable trace impurities, manufactured according to the process of claims 1, 2, 3 or 4, characterized in that it has in the aged condition a percentage elongation A% satisfying the relationship:

$$(670-Rm)/14 \leq A\% \leq (720-Rm)/17$$

wherein Rm is the maximum rupture strength of the steel, expressed in MPa.

6. A steel sheet according to claim 5, characterized that the steel in the aged condition contains carbon in free state and/or some carbides precipitated at low temperature, and it has a grain count per mm² greater than 20000.

7. A process according to claim 1, characterized in the manufactured aluminum-killed low-carbon steel strip has a maximum rupture strength, Rm, of 380 MPa or more.

8. An aluminum-killed low-carbon steel sheet for containers, comprising by weight between 0.022 and 0.035% of carbon, between 0.15 and 0.25% of manganese, between 0.040 and 0.070% of aluminum, between 0.0035 and 0.0060% of nitrogen, the remainder being iron and the inevitable trace impurities, manufactured according to the process of claims 1, 2, 3 or 4, characterized in that it has a percentage elongation A% satisfying the relationship:

$$(670-Rm)/14 \leq A\% \leq (720-Rm)/17$$

where Rm is the maximum rupture strength of the steel, expressed in MPa.

9. A steel sheet according to claim 8, characterized that the steel contains carbon in free state and/or some carbides precipitated at low temperature, and it has a grain count per mm² greater than 20000.

* * * * *